United States Patent
Armstrong-Crews

(10) Patent No.: US 11,774,583 B2
(45) Date of Patent: Oct. 3, 2023

(54) METHODS AND SYSTEMS FOR FILTERING VEHICLE SELF-REFLECTIONS IN RADAR

(71) Applicant: Waymo LLC, Mountain View, CA (US)

(72) Inventor: Nicholas Armstrong-Crews, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 420 days.

(21) Appl. No.: 17/187,269

(22) Filed: Feb. 26, 2021

(65) Prior Publication Data
US 2022/0276375 A1    Sep. 1, 2022

(51) Int. Cl.
G01S 13/89    (2006.01)
G01S 13/931   (2020.01)

(52) U.S. Cl.
CPC ............ *G01S 13/89* (2013.01); *G01S 13/931* (2013.01)

(58) Field of Classification Search
None
See application file for complete search history.

(56) References Cited

U.S. PATENT DOCUMENTS

| | | |
|---|---|---|
| 5,900,975 A | 5/1999 | Sussman |
| 6,018,728 A | 1/2000 | Spence |
| 6,323,802 B1 | 11/2001 | Tokoro |
| 6,661,370 B2 | 12/2003 | Kishida |
| 6,947,841 B2 | 9/2005 | Zimmermann |
| 8,077,075 B2 | 12/2011 | Randler |

(Continued)

FOREIGN PATENT DOCUMENTS

| | | | |
|---|---|---|---|
| CN | 112105950 A | * | 12/2020 |
| CN | 112105950 A | | 12/2020 |

OTHER PUBLICATIONS

Kraus et al., "Using Machine Learning to Detect Ghost Images in Automotive Radar", 2020 IEEE 23rd International Conference in Intelligent Transportation Systems (ITSC); https://ieeexplore.ieee.org/abstract/document/9294631.

(Continued)

*Primary Examiner* — Timothy A Brainard
*Assistant Examiner* — Hailey R Le
(74) *Attorney, Agent, or Firm* — McDonnell Boehnen Hulbert & Berghoff LLP

(57) ABSTRACT

Example embodiments relate to self-reflection filtering techniques within radar data. A computing device may use radar data to determine a first radar representation that conveys information about surfaces in a vehicle's environment. The computing device may use a predefined model to generate a second radar representation that assigns predicted self-reflection values to respective locations of the environment based on the information about the surfaces conveyed by the first radar representation. The predefined model can enable a predefined self-reflection value to be assigned to a first location based on information about a surface positioned at a second location and a relationship between the first location and the second location. The computing device may then modify the first radar representation based on the predicted self-reflection values in the second radar representation and provide instructions to a control system of the vehicle based on modifying the first radar representation.

20 Claims, 13 Drawing Sheets

(56) References Cited

U.S. PATENT DOCUMENTS

| | | |
|---|---|---|
| 8,704,704 B2 | 4/2014 | Luebbert |
| 8,718,899 B2 | 5/2014 | Schwindt |
| 9,372,261 B2 | 6/2016 | Aoki |
| 9,791,564 B1 | 10/2017 | Harris |
| 9,995,822 B2 | 6/2018 | Baftiu |
| 10,215,853 B2 | 2/2019 | Stark |
| 2022/0163649 A1* | 5/2022 | Li .......................... G01S 7/354 |

OTHER PUBLICATIONS

Ulrich et al., "DEEPREFLECS: Deep Learning for Automotive Object Classification with Radar Reflections", https://arxiv.org/ftp/arxiv/papers/2010/2010.09273.pdf.

Brazda et al., "Automotive Radar Sensor—Wave Propagation Issues and Their Mitigation", 2018 International Symposium Elmar, Croatian Society Electronics in Marine—Elmar, pp. 135-138 (2018).

* cited by examiner

METHODS AND SYSTEMS FOR FILTERING VEHICLE SELF-REFLECTIONS IN RADAR

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for filtering vehicle self-reflections that can interfere with the accuracy of radar and other types of sensor data. An example filtering technique involves using a predefined model to infer how self-reflections of the vehicle likely appear within radar data captured by the vehicle's radar system to enable these self-reflections to be removed thereby increasing the accuracy of the radar measurements.

In one aspect, an example method is provided. The method involves receiving, at a computing device and from a radar unit coupled to a vehicle, radar data indicative of an environment and determining a first radar representation that conveys information about a plurality of surfaces in the environment based on the radar data. The method further involves generating, by the computing device and using a predefined model, a second radar representation that assigns predicted self-reflection values to respective locations of the environment based on the information about the plurality of surfaces conveyed by the first radar representation. The predefined model enables a predefined self-reflection value to be assigned to a first location based on information about a surface positioned at a second location and a relationship between the first location and the second location. The method also involves modifying the first radar representation based on the predicted self-reflection values in the second radar representation and providing instructions to a control system of the vehicle based on modifying the first radar representation.

In another aspect, an example system is provided. The system includes a radar unit coupled to a vehicle and a computing device. The computing device is configured to receive, from the radar unit, radar data indicative of an environment and also configured to determine a first radar representation that conveys information about a plurality of surfaces in the environment based on the radar data. The computing device is also configured to generate, using a predefined model, a second radar representation that assigns predicted self-reflection values to respective locations of the environment based on the information about the plurality of surfaces conveyed by the first radar representation. The predefined model enables a predefined self-reflection value to be assigned to a first location based on information about a surface positioned at a second location and a relationship between the first location and the second location. The computing device is also configured to modify the first radar representation based on the predicted self-reflection values in the second radar representation and also configured to provide instructions to a control system of the vehicle based on modifying the first radar representation.

In yet another example, an example non-transitory computer readable medium having stored therein program instructions executable by a computing system to cause the computing system to perform functions is provided. The functions may involve receiving, from a radar unit coupled to a vehicle, radar data indicative of an environment and determining a first radar representation that conveys information about a plurality of surfaces in the environment based on the radar data. The functions also involve generating, using a predefined model, a second radar representation that assigns predicted self-reflection values to respective locations of the environment based on the information about the plurality of surfaces conveyed by the first radar representation. The predefined model enables a predefined self-reflection value to be assigned to a first location based on information about a surface positioned at a second location and a relationship between the first location and the second location. The functions also involve modifying the first radar representation based on the predicted self-reflection values in the second radar representation and providing instructions to a control system of the vehicle based on modifying the first radar representation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
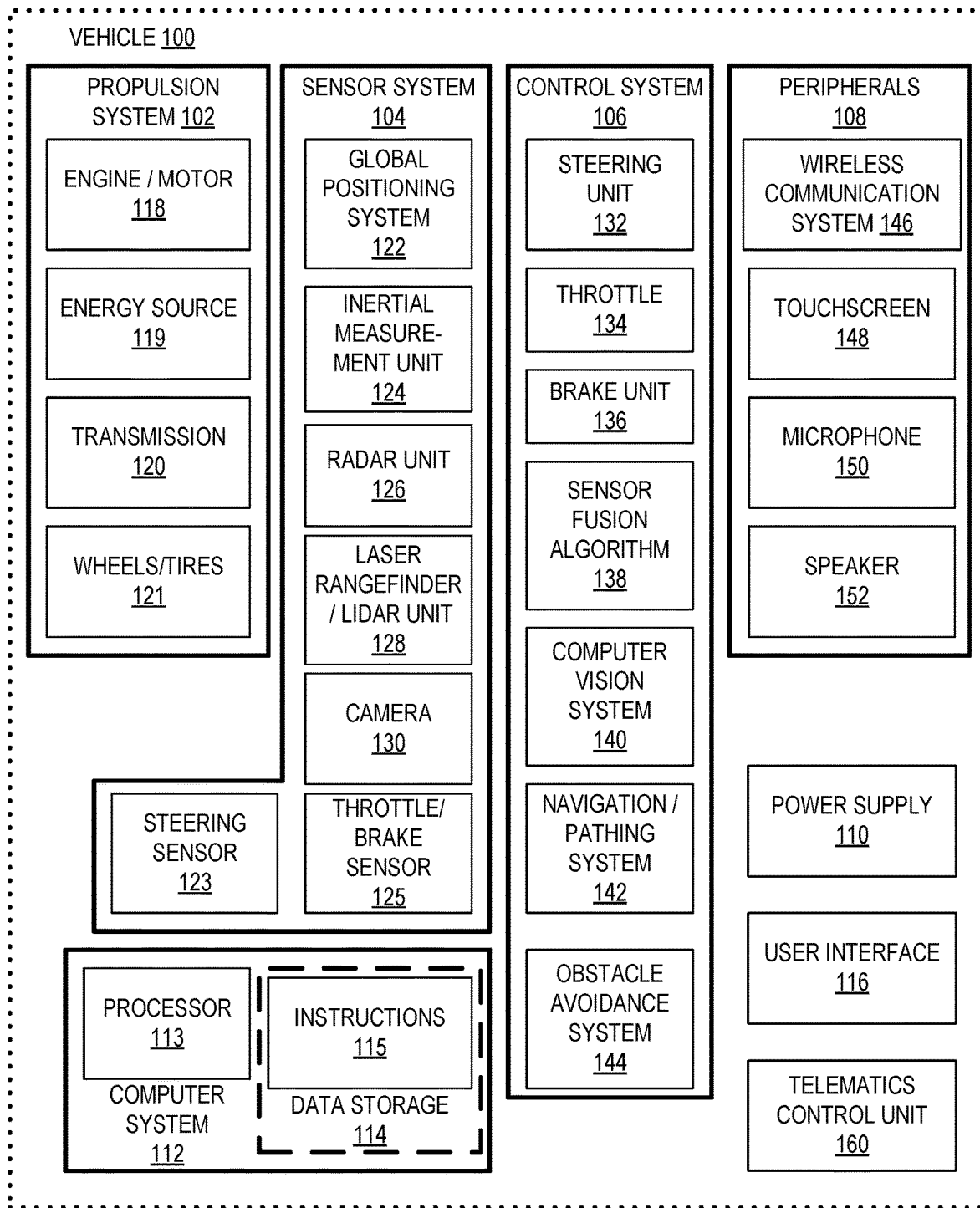
FIG. 1 is a functional block diagram illustrating a vehicle, according to one or more example embodiments.
Figure 2A:
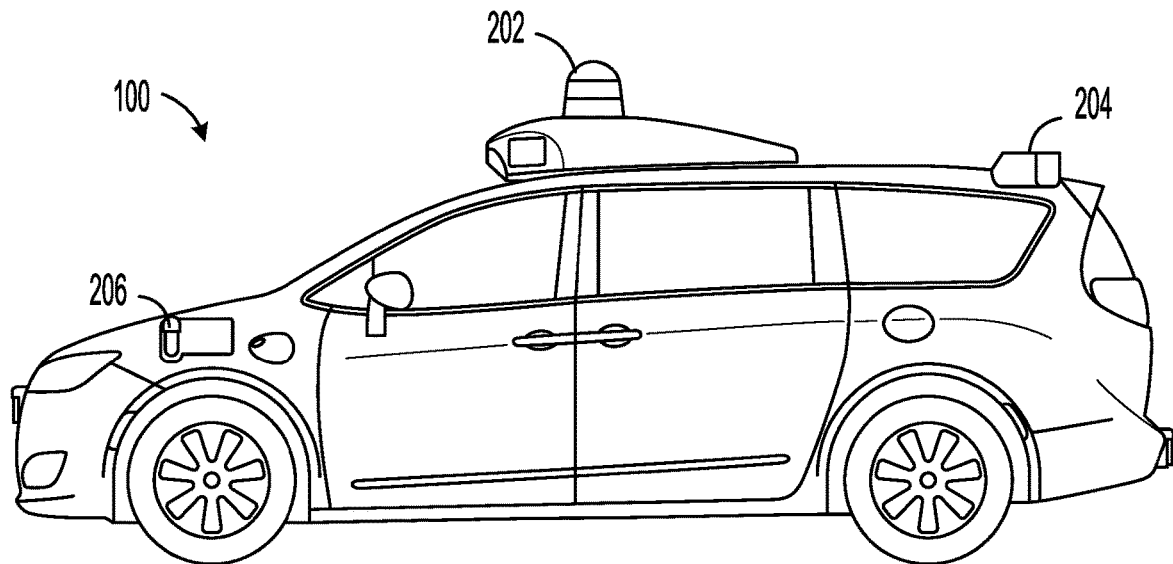
FIG. 2A illustrates a side view of a vehicle, according to one or more example embodiments.
Figure 2B:
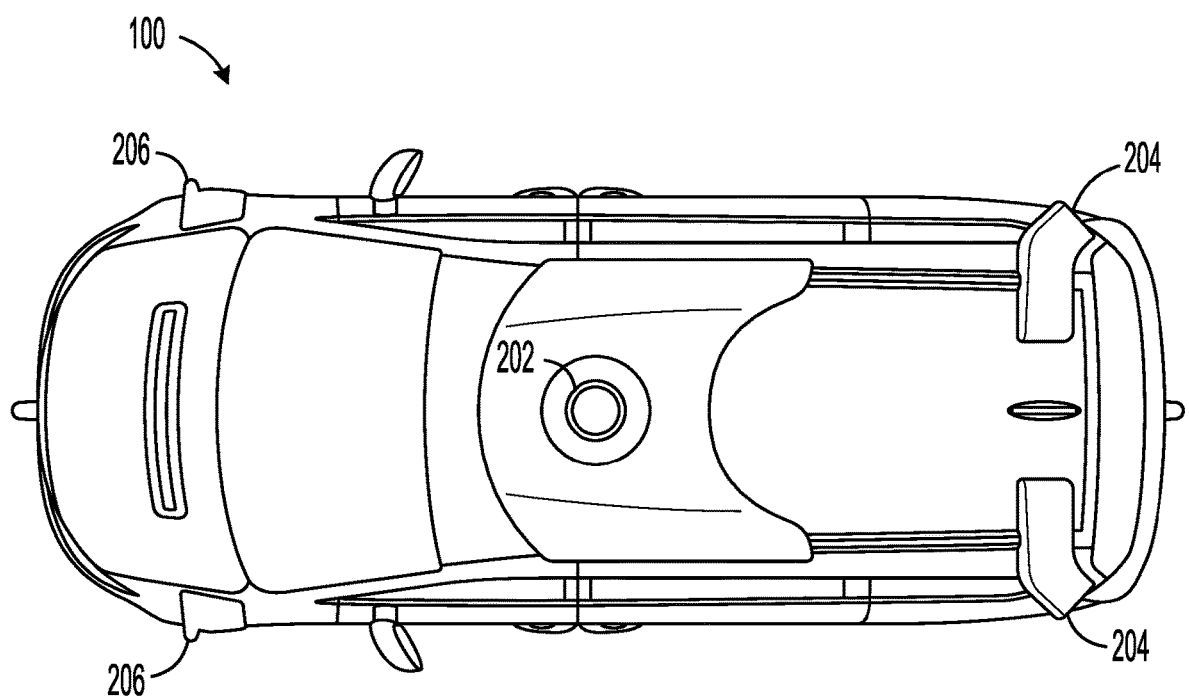
FIG. 2B illustrates a top view of a vehicle, according to one or more example embodiments.
Figure 2C:
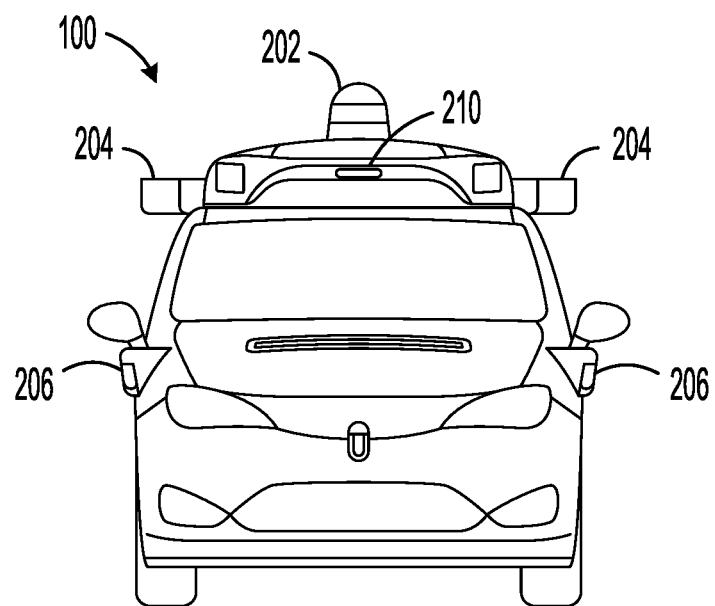
FIG. 2C illustrates a front view of a vehicle, according to one or more example embodiments.
Figure 2D:
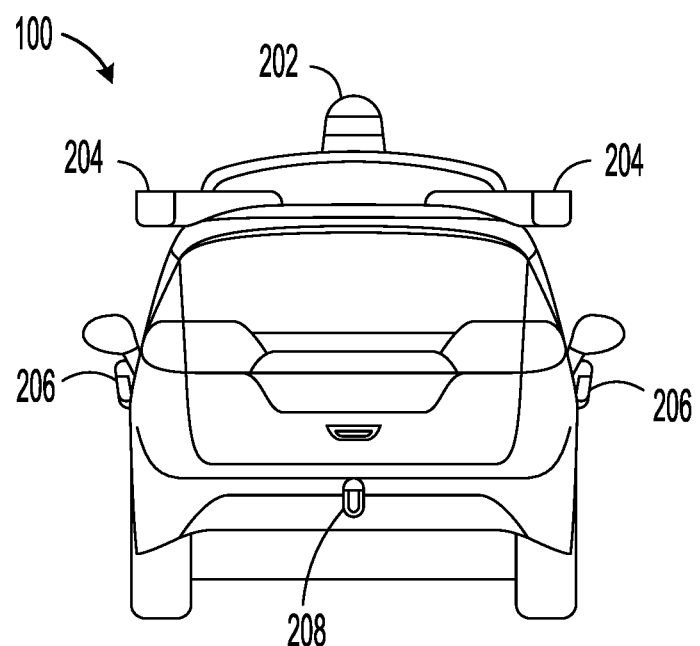
FIG. 2D illustrates a back view of a vehicle, according to one or more example embodiments.
Figure 2E:
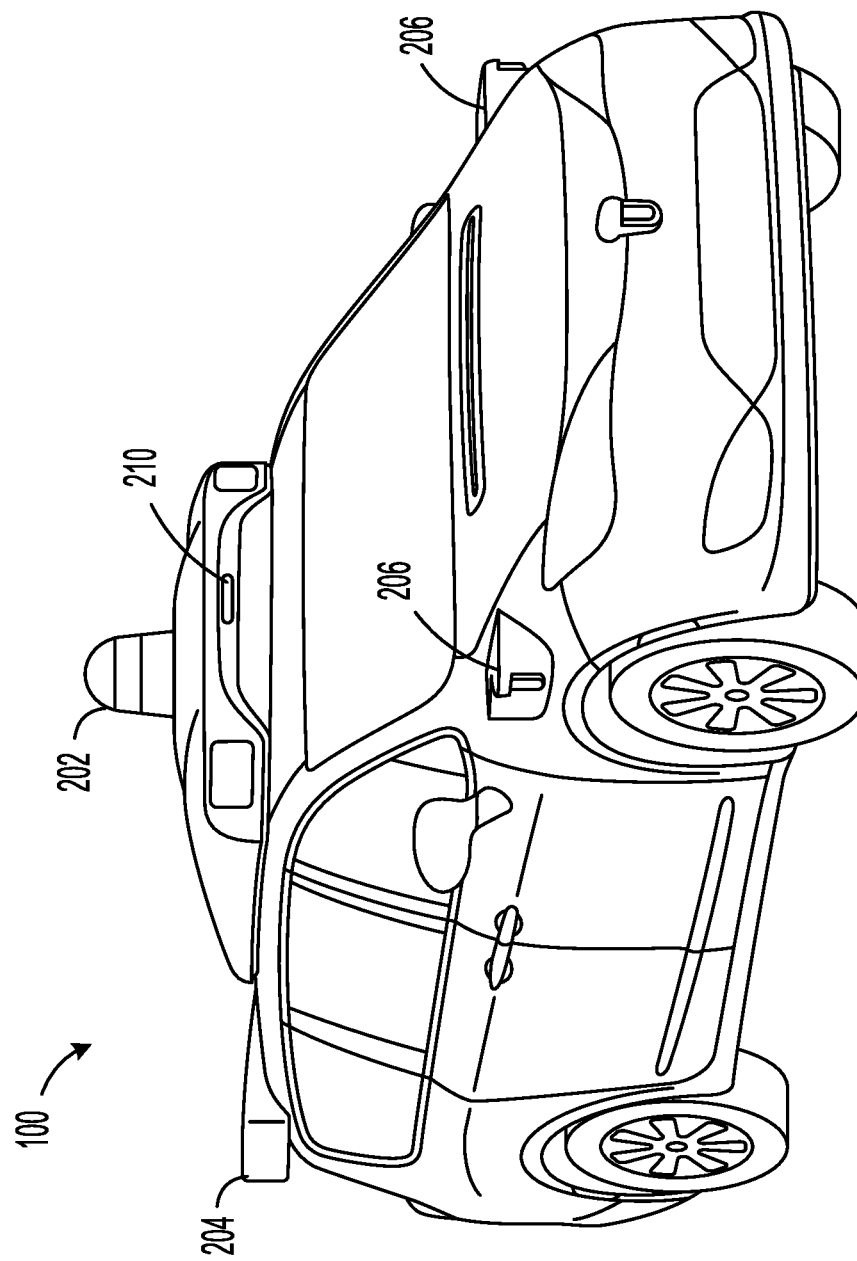
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting electromagnetic signals (i.e., radar signals) and analyzing the backscattered signals from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit.

A radar processing system (e.g., a computing device) may process radar data to generate two dimensional (2D) and/or three dimensional (3D) measurements that represent aspects of the environment, such as the positions, orientations, and movements of nearby objects and other surfaces occupying the environment near the radar system. Because a radar system can be used to measure distances and motions of nearby objects and other surfaces, vehicles are increasingly incorporating vehicle radar systems that can obtain and provide useful information for vehicle navigation, obstacle avoidance, and other vehicle operations that can boost overall vehicle safety. Radar can be used to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, radar offers a way for vehicle systems to continuously monitor and understand changes during navigation in various environments and can supplement sensor data from other types of sensors.

In some applications, a vehicle radar system can provide information aimed to assist the vehicle's driver. For instance, radar measurements may be used to generate alerts when the vehicle drifts outside its lane, when the vehicle travels too closely to another vehicle or object, and/or in other ways that can help the driver safely control the vehicle.

Radar measurements can also be used to help enable autonomous or semi-autonomous operations by the vehicle. In particular, radar data can be used by control systems to understand and safely navigate the vehicle's environment in near real-time as discussed above.

The reflective properties of various objects that vehicles encounter during navigation can impact sensor data accuracy in some instances. In addition, some objects may have specular reflection properties that can distort sensor data. For example, metals signs and other objects (e.g., other vehicles) in a vehicle's environment can cause self-reflections of the vehicle to appear within sensor data, which can trigger an undesired reaction from the control system (e.g., braking or swerving). Although detection of ghost vehicles can impact images from cameras and LIDAR data, radar may be negatively impacted more frequently during vehicle navigation due to a high number of objects having specularly reflective properties at radar wavelengths. This is, metal traffic signs and other objects may act as mirrors and produce strong reflections that can cause the radar system to observe one or more self-reflections of the vehicle itself positioned behind the object and approaching the vehicle at a speed that is approximately double the vehicle's current speed. Although the ghost vehicle detected within the radar data is merely the vehicle's own reflection, the vehicle's control system may fail to differentiate the ghost vehicle from other physical object detections and respond by performing some undesirable action (e.g., braking or swerving) to avoid the ghost vehicle. Therefore, there exists a need to be able to detect and avoid vehicle self-reflections to increase reliability of sensor data.

Example embodiments presented herein describe vehicle self-reflection filtering techniques that can enable the detection and removal of vehicle self-reflections within radar. In some examples, the vehicle self-reflection filtering techniques described herein may be performed when processing sensor data from another type of sensor, such as LIDAR or cameras (e.g., time-of-flight cameras). In some examples, vehicle self-reflection filtering techniques can involve using a model that is calibrated a priori and can be used to represent what the vehicle would look like to itself within radar data (or another type of sensor data). By representing how ghost vehicle data likely appears within incoming radar data, a processing system can detect and filter radar data to remove (or otherwise detect and disregard) ghost vehicle detections, which can increase accuracy of the radar measurements as a result. In addition, performance of a filtering technique can help prevent the control system from engaging in unnecessary actions during navigation, such as swerving or braking to avoid a detected ghost vehicle.

To further illustrate, for a measured surface detected at a range R and azimuth θ, a computing device can use a predefined model to infer what a self-reflection of the vehicle (i.e., a ghost vehicle) would look like beyond that measured surface. In particular, the computing device may use the model to infer how the ghost vehicle would likely appear at a location that is approximately double the range of the measured surface and aligned at the same azimuth relative to the vehicle (i.e., a ghost vehicle located at range 2R and azimuth θ). The inferred ghost vehicle can then be subsequently filtered from the measured data representing the location at range 2R and azimuth θ.

As an example, a metal sign positioned 6 meters from a vehicle may cause a self-reflection of the vehicle to appear at 12 meters from the vehicle. Both the metal sign and the ghost vehicle representing the vehicle self-reflection may be aligned along the same azimuth relative to the vehicle. As such, the model can enable the computing device to predict a power associated with the detection of the ghost vehicle based on the radar cross section (RCS) measured for the metal sign. The RCS measurement represents how detectable the metal sign is by radar. When processing radar data corresponding to the surfaces located along the same azimuth and at 12 meters from the vehicle (i.e., where the ghost vehicle is located), the computing device can subtract the predicted power to prevent the vehicle self-reflection from impacting radar measurements of the surfaces actually located at 12 meters from the vehicle in the environment.

An extensive model can be developed that can be used for self-reflection filtering when processing radar returns during vehicle navigation. The extensive model can emulate the above process for numerous locations measured by vehicle radar. For example, the model can allow potential self-reflections of the vehicle to be filtered based on measurements spanning across the entire field of view associated with the operation of a radar unit or multiple radar units.

To develop the extensive model, the computing device can perform the above process for numerous hypothesized surfaces (e.g., all densely-sampled locations [R, θ]) and aggregate the effects of anticipated ghost vehicles based on the measured RCS of each location. Thus, rather than predicting what a vehicle self-reflection may appear in radar data for a single location, the filtering technique can factor how vehicle self-reflections may appear at numerous locations measured within radar returns since objects or other surfaces in the environment can have different RCS measurements that can produce vehicle self-reflections in different ways. As a result, a computing device can efficiently filter incoming radar data to factor potential vehicle-self reflections that can arise within radar measurements, which may help prevent the vehicle control system from performing undesired operations in response to detecting a ghost vehicle.

In practice, a system may infer what vehicle self-reflections would look like at different stages of radar processing. For example, the system may perform a self-reflection filtering technique on incoming complex raw radar return data on a field-programmable gate array (FPGA). A computing device may use radar data to determine a radar data cube having voxels that represent portions of the environment. The radar data cube may have dimensions that represent different information from the radar measurements (e.g., range data, azimuth data, and Doppler data). As such, each voxel within the radar data cube can indicate a RCS measurement and other information (e.g., Doppler data) for a surface located at a given range and an azimuth relative to the vehicle. Thus, the data cube can be constructed with multiple voxels to convey information about various surfaces measured via radar.

In order to anticipate potential vehicle self-reflections, the computing device can use the model described above to generate a vehicle self-reflection data cube that can be used for filtering potential power associated with ghost vehicles from power associated with surfaces represented by the radar data cube. In particular, the vehicle self-reflection data cube can also include voxels that can be aligned with the radar data cube representing the radar measurements. The vehicle self-reflection data cube, however, may be generated to represent predicted RCS measurements indicative of how ghost vehicles would appear within data for the different portions of the environment.

Each predicted RCS measurement represented in the vehicle-reflection data cube can convey a power level associated with a potential ghost vehicle detection and may depend on a given RCS measurement associated with a given surface as represented by a voxel in the radar data cube. A predicted RCS measurement can be estimated and assigned to a given location based on a relationship with a surface in the environment and the information determined for the surface. For example, if the radar cross section determined for a surface in the environment is above a threshold power level, the computing device may determine that a sign or another type reflective surface is likely positioned at that location. The reflective surface likely caused a large amount of electromagnetic energy to reflect back for reception by the radar system. As such, the computing device can use the model to infer where and how the surface may cause a ghost vehicle to appear in radar. In particular, the model may indicate that the surface may cause the ghost vehicle to appear at a location positioned approximately double the range of the surface and approximately aligned at the same azimuth, such that the ghost vehicle appears to be traveling from behind the surface and toward the vehicle. In addition, the model may also indicate that the ghost vehicle would have approximately double the Doppler as the Doppler measured for the surface.

By using the model, the computing device can generate voxels within the vehicle self-reflection data cube to represent predicted RCS measurements for numerous locations having various RCS measurements as represented by the radar data cube. For instance, for a surface having a given RCS measurement, a Doppler value "D" and located at 10 meters and azimuth θ relative to the vehicle, the computing device may use the model to infer that a vehicle self-reflection would likely appear with a Doppler value "2D" (e.g., approximately double the Doppler for the surface) at a location that is located at 20 meters and the same azimuth θ relative to the vehicle. In addition, the estimated RCS associated with the ghost vehicle would depend on the RCS measurement for the surface located at 10 meters from the vehicle. The computing device can infer ghost vehicle power estimates for various locations based on a similar technique applied for the various surfaces measured via radar and represented by voxels within the radar data cube. These inferences can be used to construct the voxels of the vehicle self-reflection data cube.

To remove potential ghost vehicles within radar data, the computing device can then filter the predicted RCS measurements within the vehicle self-reflection data cube from different locations represented in the radar data cube. That is, the predicted power of ghost vehicles can be directly filtered (e.g., subtracted) from the radar data cube, which produces a modified radar data cube representing radar measurements of the environment without the power associated with self-reflections of the vehicle. The modified radar data cube can then be used to map the environment without potential self-reflections of the vehicle impacting the measurements within the map. In addition, the filtering operation can involve subtraction or other filtering techniques within examples.

In some examples, the system can perform a similar operation in 2D projected radar imagery, although subtraction may no longer be the optimal operation in some instances. Instead, the system may render the self-reflections as an imagery layer that is input along with the projected radar imagery for a deep network (e.g., a neural network) to figure out the appropriate function representing the "filtering" (i.e., the removal of reflection). Visually, this reflection image may appear to contain multiple superimposed ghost copies of the vehicle all across the image.

The radar range equation (RRE) represents an example predictive model that can be used to infer the signal power of a vehicle self-reflection (e.g., ghost vehicle located at double range (2R), same azimuth (θ), and double Doppler (2D)) with a priori vehicle model RCS(θ) and surface measurement RCS (2R, θ, 2D). The a priori vehicle model RCS(θ) could be built by circling the vehicle with a known RCS reflector (e.g., a radar corner cube often used for calibration) and measured by the vehicle's radar in an otherwise empty scene or a second vehicle measuring the first with a direct path. In some examples, the system may perform a similar process for multiple vehicle self-reflections, which may occur at ranges of all positive multiples of 2R. As such, this subtractive method can enable a vehicle radar system to detect and identify objects that are otherwise "covered up" by the self-reflection of the vehicle. This differs from other techniques, which may involve throwing away (i.e., not using) any object detections where the system sees an undesired vehicle self-reflection. In other examples, other models can be used to develop a predictive model that can be used to infer the signal power of a vehicle self-reflection.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
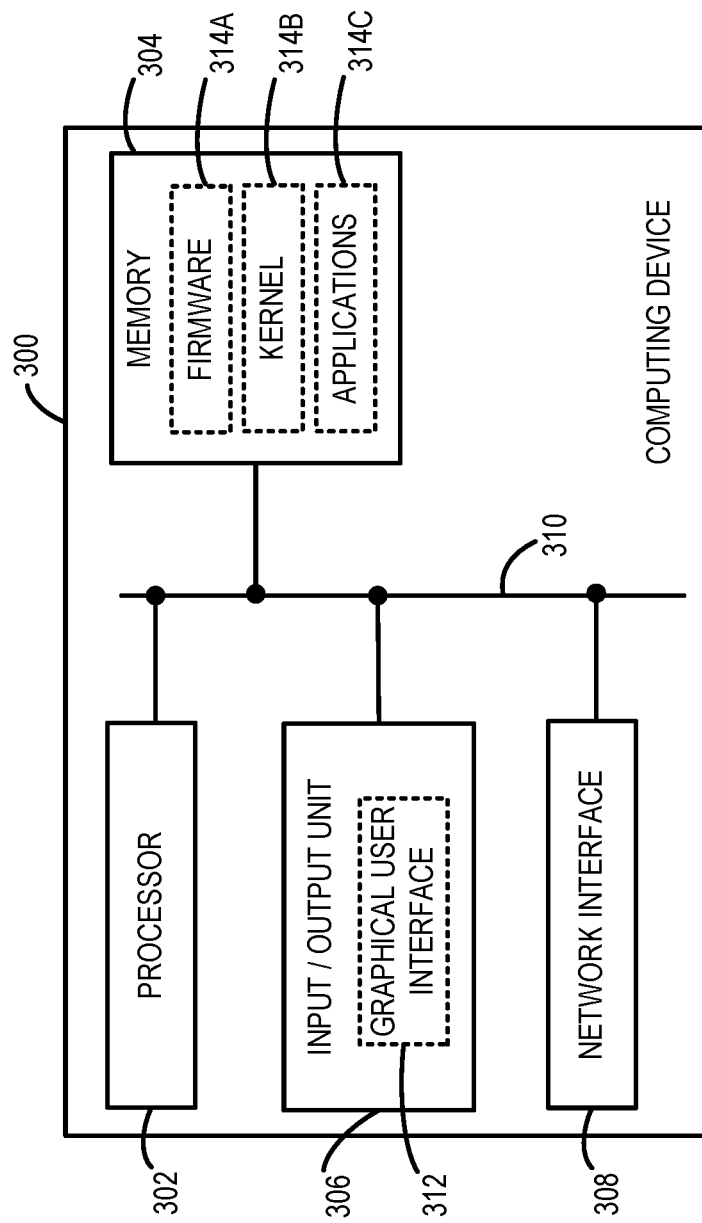
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform.

In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient processing of sensor data.

Figure 4:
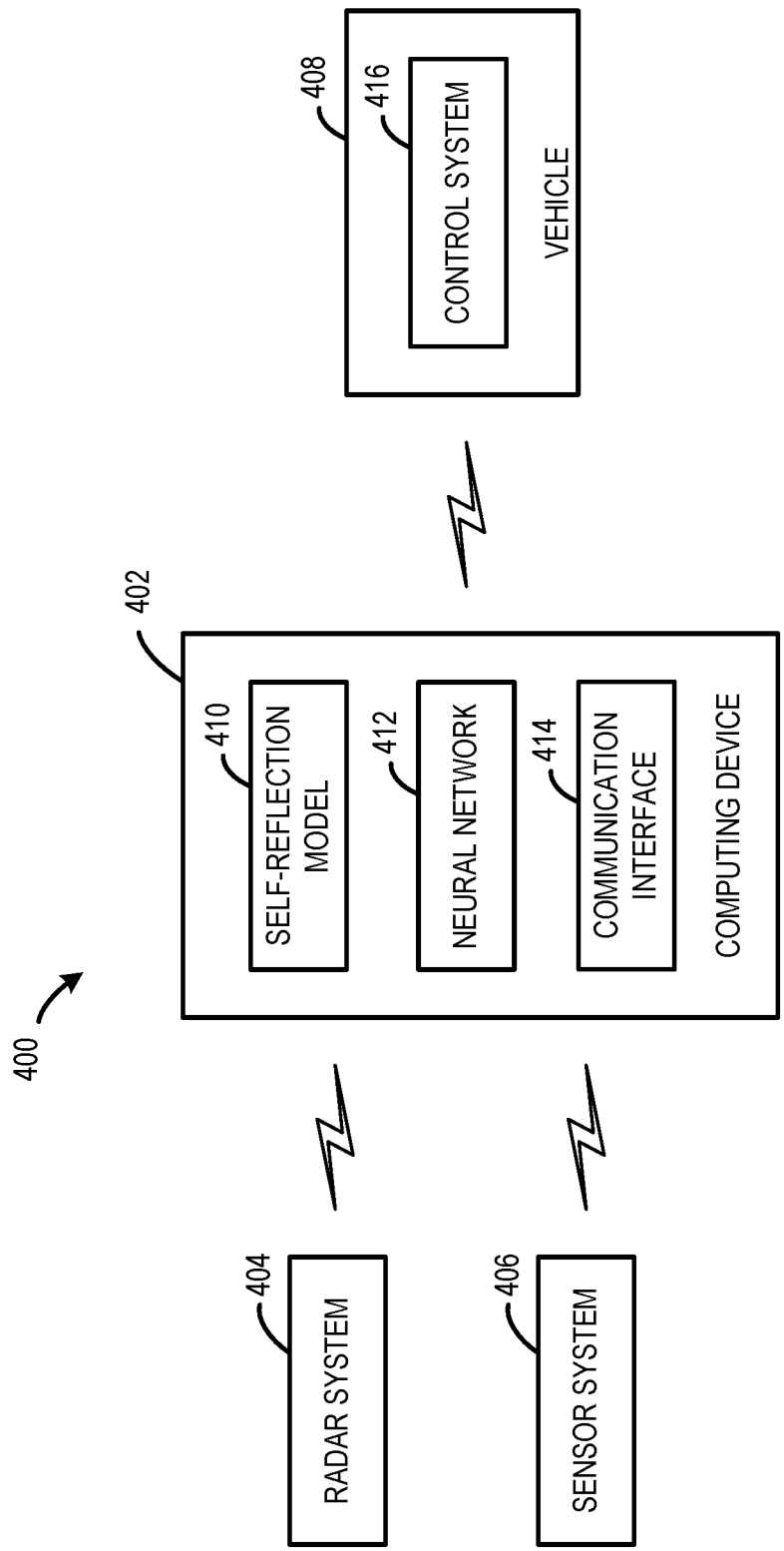
FIG. 4 is a system for filtering vehicle self-reflections in sensor data, according to one or more example embodiments.

FIG. 4 is a system for filtering vehicle self-reflections in sensor data. In the example embodiment, system 400 includes computing device 402, radar system 404, sensor system 406, and vehicle 408. In other embodiments system 400 can include other components not shown in FIG. 4.

System 400 can perform vehicle self-reflection filtering techniques presented herein to enhance the performance of vehicle 408. In particular, computing device 402 can use one or more filtering techniques to detect and filter sensor data that represents self-reflections of vehicle 408 caused by metal signs, vehicles, and other surfaces in the environment. System 400 can iteratively perform the filtering technique to remove self-reflections of vehicle 408 from radar data or other types of sensor data used to enable vehicle 408 to autonomously navigate between locations.

During navigation of vehicle 408, radar system 404 and sensor system 406 may capture sensor data representing measurements of the environment. In some cases, one or more objects can cause radar data (or another type of sensor data) to include undesired self-reflections of vehicle 408. For example, the reflective properties of a metal sign can cause a ghost vehicle to appear approaching vehicle 408 from behind the metal sign, which may trigger control system 416 to brake or swerve to avoid the ghost vehicle. These actions by control system 416 are undesirable because the ghost vehicle is merely a reflection caused by the metal sign and altering strategy can negatively impact the autonomous performance of vehicle 408. As such, system 400 can assist with navigation of vehicle 408 by enabling these ghost vehicles to be anticipated, detected, and removed from sensor data obtained from radar system 404 and sensor system 406 via one or more vehicle self-reflection techniques presented herein.

Computing device 402 represents one or more processing units within system 400 that can perform one or more operations described herein. For instance, computing device 402 can be configured to perform method 600 and/or method 800 shown in FIGS. 6 and 8, respectively. Computing device 402 may be implemented as computing system 112 of FIG. 1, computing device 300 of FIG. 3, or another type of processing device or group of devices. In some embodiments, computing device 402 is located onboard vehicle 408 and may incorporate one or more FPGAs associated with radar system 404. By having computing device 402 located onboard vehicle 408, the time required for communication between components within system 400 can be reduced. In other embodiments, computing device 402 may be located physically separate from vehicle 408. In particular, computing device 402 may be positioned remotely and communicate wirelessly with one or more computing systems (e.g., control system 416) located onboard the vehicle.

Radar system 404 represents one or more radar units that can transmit radar signals into the environment and receive radar reflections off surfaces in the environment. Distances to radio-reflective features in the environment can then be determined according to the time delay between transmission and reception. Radar system 404 can emit a signal that varies in frequency over time, such as a signal with a time-varying frequency ramp, and then relate the difference in frequency between the emitted signal and the reflected signal to a range estimate. In some examples, radar system 404 may also estimate relative motion of reflective objects based on Doppler frequency shifts in the received reflected signals. In addition, directional antennas can be used by radar system 404 for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

Sensor system 406 represents other types of sensors that can supplement navigation operations of vehicle 408. For instance, sensor system 406 may include a camera system with one or more types of cameras (e.g., time of flight cameras) and/or a LIDAR system that can measure the surrounding environment of vehicle 408. In addition, vehicle 408 may correspond to any type of vehicle that uses radar system 404 in some capacity. For instance, vehicle 408 can correspond to a passenger vehicle that transports passengers between locations. Vehicle 408 can similarly be used to transport cargo or other goods.

To assist with navigation of vehicle 408, computing device 402 may perform a filter technique to remove ghost vehicle detections (i.e., self-reflections of vehicle 408) within radar data obtained via radar system 404 and/or other sensor data from sensor system 406. For instance, computing device 402 can cause radar system 404 to transmit radar signals into the surrounding environment of vehicle 408 and obtain radar data that represent reflections off objects and other surfaces in the environment as vehicle 408 travels. When performing processing techniques, computing device 402 may separate targets from clutter on the basis of Doppler content and amplitude characteristics. The conversion of radar signals to digital form can be performed by computing device 402 after IF amplification and phase sensitive detection. Computing device 402 may use communication interface 414 to engage in wired or wireless communication with other components within system 400.

Computing device 402 can determine a radar representation that conveys information about surfaces in the environment. In some implementations, the radar representation can include RCS measurements that are assigned to represent surfaces positioned at different locations in the environment. To filter out self-reflections of vehicle 408 from the radar representation, computing device 402 may generate a vehicle self-reflection representation that assigns predicted vehicle self-reflection information (e.g., predicted RCS values) to different locations in the environment based on vehicle self-reflection model 410. In particular, vehicle self-reflection model 410 may enable predefined self-reflection values to be assigned to locations based on information about a surface positioned at other locations and the relationship between these locations. The relationship between the locations can depend on the locations being aligned along the same azimuth relative to vehicle 408 and can reflect the expected nature of a ghost vehicle appearing at double the range of a surface as if the ghost vehicle is traveling toward vehicle 408 from behind the reflective surface. As such, the information within the generated vehicle self-reflection representation can be filtered from the radar representation, which produces a modified radar representation that includes measurements corresponding to surfaces in the environment without data representing the self-reflections of vehicle 408.

After filtering ghost vehicle detections from radar data (or another type of sensor data), computing device 402 may use the remaining data to detect and identify objects and generally map the environment. Computing device 402 may then supply information mapping the environment to control system 416, which can use the information to safely navigate vehicle 408 through the surrounding environment. In some embodiments, computing device 402 may perform filtering techniques in parallel for radar data obtained from different radar units within radar system 404. Similarly, computing device 402 can also perform filtering techniques simultaneously for radar data and sensor data from sensor system 406.

In some embodiments, computing device 402 may use neural network 412 to perform one or more aspects of the filtering process. For instance, computing device 402 may provide radar data and predicted power associated with self-reflections of vehicle 408 within the radar data to neural network 412 to filter the predicted power from the radar data. Neural network 412 may enable radar data to be used for object identification and localization without undesired noise from potential self-reflections of vehicle 408. In some examples, neural network 412 is trained with a dataset with ground truth labels of "vehicle or not vehicle" (e.g., a bounding box drawn around any true vehicle) provided by human labelers. The labelers may use recorded laser and/or camera data to help determine the ground truth 3D boxes. As such, the relative position and orientation of the radars with respect to the cameras and lasers is known, which enables determination of where those 3D boxes lie in the radar image.

In some embodiments, computing device 402 can use sensor system 406 to supplement processing radar data from radar system 404. For instance, sensor system 406 can be used to confirm whether detected objects are located in the environment of vehicle 408 when filtering techniques fail to remove radar data indicative of a ghost vehicle.

Figure 5A:
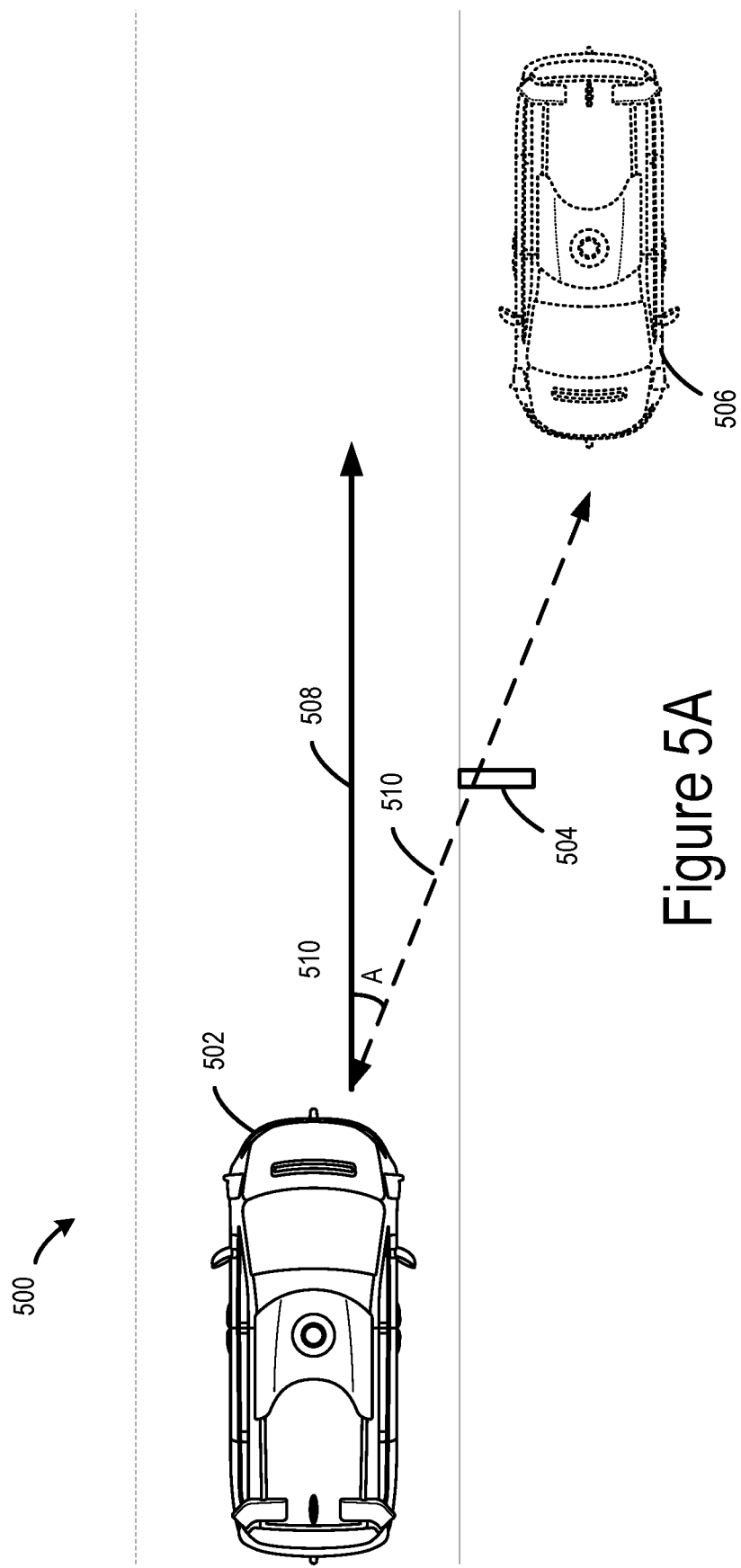
FIG. 5A depicts a top view of a vehicle performing a self-reflection filtering technique, according to one or more example embodiments.
Figure 5B:
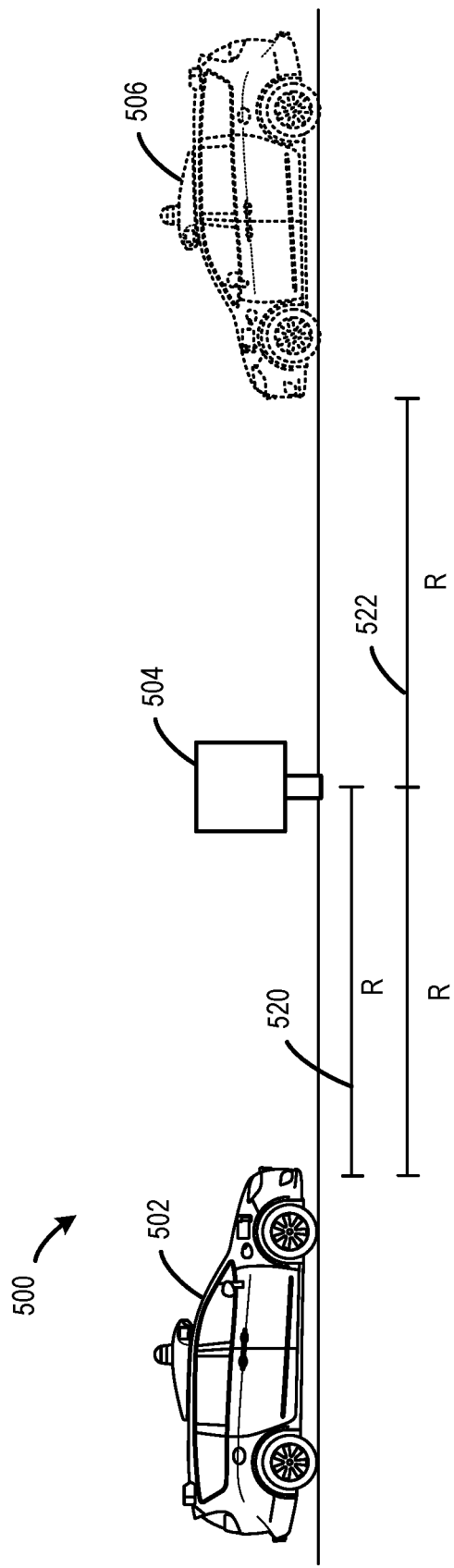
FIG. 5B depicts another view of the vehicle performing the self-reflection filtering technique, according to one or more example embodiments.

FIGS. 5A and 5B illustrates a vehicle performing a self-reflection filtering technique, according to one or more example embodiments. In the example embodiment, scenario 500 represents a simplified illustration that depicts vehicle 502 traveling a path using sensor data to understand its surroundings and enable safe navigation. For instance, the path may correspond to a route through a city environment, a highway environment, or a rural environment, etc. As such, sensor data can enable vehicle 502 to detect, identify, and avoid potential obstacles while also allowing vehicle 502 to navigate according to traffic regulations and road boundaries.

FIG. 5A illustrates scenario 500 from a bird's eye view, which shows vehicle 502 navigating a straight path while capturing sensor data (e.g., radar data) to understand the surrounding environment. As shown, vehicle 502 may obtain radar measurements that indicate the presence of sign 504 and ghost vehicle 506 aligned at azimuth 510 relative to boresight 508. Ghost vehicle 506 may appear within radar data due to the reflective nature of sign 504 causing a self-reflection of vehicle 502 to appear at the location of ghost vehicle 506. As such, without filtering data corresponding to ghost vehicle 506, vehicle 502 may potentially perform undesirable actions to avoid ghost vehicle 506.

FIG. 5B illustrates scenario 500 from a side view, which shows the ranges (distances) between vehicle 502, sign 504, and ghost vehicle 506. As discussed above, reflective surfaces can cause self-reflections of vehicle 502 to appear within radar data and other types of sensor data. In scenario 500, sign 504 is located at range 520 relative to vehicle 502 and may cause ghost vehicle 506 to appear within radar data at range 522 relative to vehicle 502. Range 522 (i.e., the distance between vehicle 502 and ghost vehicle 506) is approximately double the distance between vehicle 502 and sign 504 (i.e., range 520). For example, range 520 may represent 12 meters between vehicle 502 and sign 504 while range 522 represents 24 meters between vehicle 502 and ghost vehicle 506. As such, a predefined model can anticipate the location of ghost vehicle 506 based on measurements obtained for sign 504, which further enables a computing device to filter ghost vehicle 506 from the data.

In some examples, radar may indicate that sign 504 is measured with a Doppler value "D". As such, the model used to predict power within radar corresponding to ghost vehicle 506 may indicate that ghost vehicle 506 has approximately double the Doppler value "D". As such, the computing device can factor Doppler measurements when anticipating and filtering ghost vehicle 506 from radar data representing one or more surfaces at the location of ghost vehicle 506.

Figure 6:
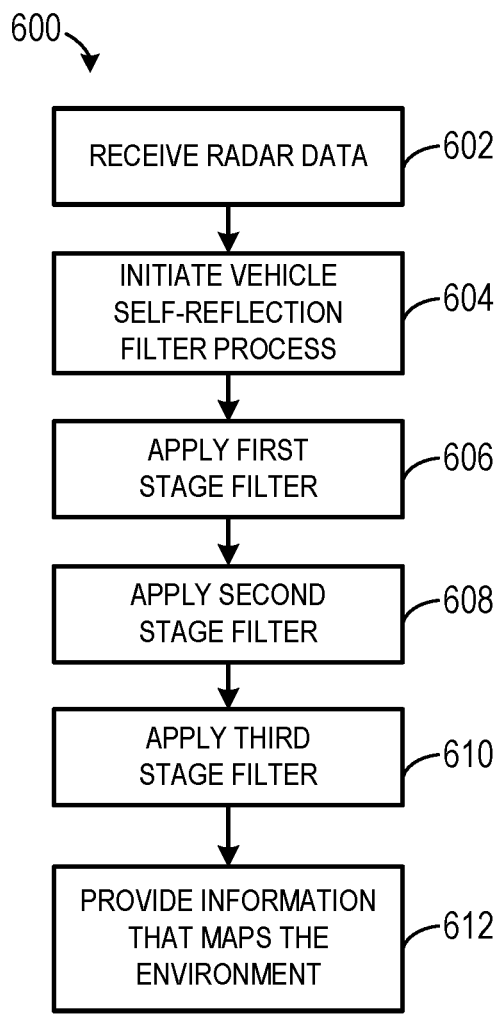
FIG. 6 is a flow chart of a method for performing a vehicle self-reflection technique, according to one or more example embodiments.

FIG. 6 is a flowchart of example method 600 for filtering self-reflections of a vehicle, according to one or more embodiments. Method 600 may include one or more operations, functions, or actions, as depicted by one or more of blocks 602, 604, 606, 608, 610, 612, and 614, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 602, method 600 involves receiving radar data. A sensor processing system (e.g., computing device 402 shown in FIG. 4) may obtain radar data from a vehicle radar system for subsequent processing to understand a vehicle's environment. In other embodiments, a different type of sensor can be used, such as LIDAR or time-of-flight cameras. In addition, radar data can originate from one or more radar units associated with a vehicle radar system.

At block 604, method 600 involves initiating a vehicle self-reflection filter process. In some embodiments, the self-reflection filter process can be a pipeline with a series of stages. Although stages are shown in a linear order for method 600 shown in FIG. 6, other example methods can involve performing multiple stages in parallel. In addition, method 600 may involve automatically applying one or more filter techniques in some example embodiments. In particular, radar processing may involve automatically filtering for vehicle self-reflections to increase accuracy of radar measurements. In some examples, the filter process may involve performing a particular stage or set of stages.

At block 606, method 600 involves applying a first stage filter. In particular, the vehicle self-reflection filter process may initially involve determining a radar representation that conveys information about surfaces in the environment based on the radar data. The first stage of the pipeline can involve using a radar data cube to convey environment information and generating a corresponding data cube that represents vehicle self-reflection information that can be used to remove undesired data within radar.

Figure 7A:
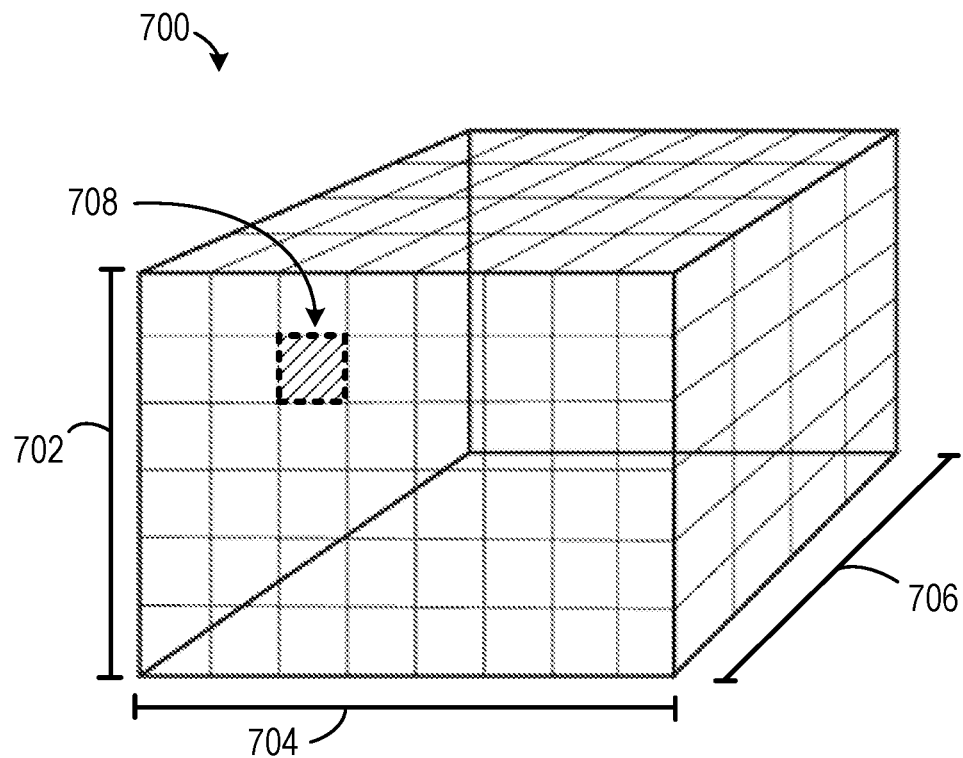
FIG. 7A depicts a three-dimensional (3D) radar data cube, according to one or more example embodiments.

FIG. 7A illustrates example radar data cube 700, which includes voxels arranged to represent radar measurements of the environment. In particular, radar data cube 700 may indicate range data 702, Doppler data 704, and azimuth data 706 for different surfaces located within the environment and detected within radar data. For example, voxel 708 may convey a measured RCS and Doppler for a surface in the environment located at a particular range and azimuth relative to the vehicle.

Radar data cube 700 may represent information that radar hardware collected regarding the scene of the vehicle. This is, for every voxel in radar data cube 700, a RCS may be measured and associated with that voxel. For instance, a computing device can measure the RCS(Range, θ, Doppler) for a voxel with a set of coordinates (Range, θ, Doppler) and repeat this process for each voxel. In some instances, RCS measurements can be determined in parallel for the voxels.

The structure of radar data cube 700 can be similarly used to represent vehicle self-reflection information. For instance, a computing device can generate a similarly configured data cube that represents predicted power associated with self-reflections of the vehicle (i.e., a vehicle self-reflection cube). In order to generate the vehicle self-reflection cube, the computing device may use a predefined model to associate a predicted RCS with each voxel based on the RCS measured for a corresponding voxel within radar data cube 700. The predefined model involves factoring measured RCSs of surfaces in the environment to predict RCS associated with vehicle self-reflections as they likely appear within the radar data.

As an example, the computing device may use the model of what the vehicle would look like to the radar system if reflected from a reference isotropic emitter for any RCS measurement, range, azimuth, and Doppler (e.g., RCS_self (RCS(Range, θ, Doppler)). For a metal sign located at a range of 10 meters, azimuth of 45 degrees, and Doppler value D, the metal sign may cause a ghost vehicle to appear at 20 meters, azimuth of 45 degrees, and Doppler value 2D. As such, the vehicle self-reflection cube may indicate an estimated RCS power for the ghost vehicle at that location (e.g., 20 meters, azimuth of 45 degrees, and Doppler value 2D). Another metal sign located at a range of 12 meters, azimuth of 40 degrees, and Doppler value D may cause a ghost vehicle to appear at 24 meters, azimuth of 40 degrees, and Doppler value 2D. The vehicle self-reflection cube may also indicate an estimated RCS power for this ghost vehicle at that location (e.g., 24 meters, azimuth of 40 degrees, and Doppler value 2D) as well.

The filtering process of the first stage can then involve filtering the information within the vehicle self-reflection cube from radar data cube 700. In particular, the predicted RCS of each voxel within the vehicle self-reflection cube can be filtered (e.g., subtracted) from the measured RCS of corresponding voxels within radar data cube 700. As a result, the modified radar data cube 700 includes RCS measurements that do not include the power associated with self-reflections of the vehicle.

At block 608, method 600 involves applying a second stage filter. The second stage filter may involve using one or more two-dimensional radar images corresponding to the radar data. For example, the radar data can be used to determine a 2D radar image that includes pixels that each indicate information about a given surface.

Figure 7B:
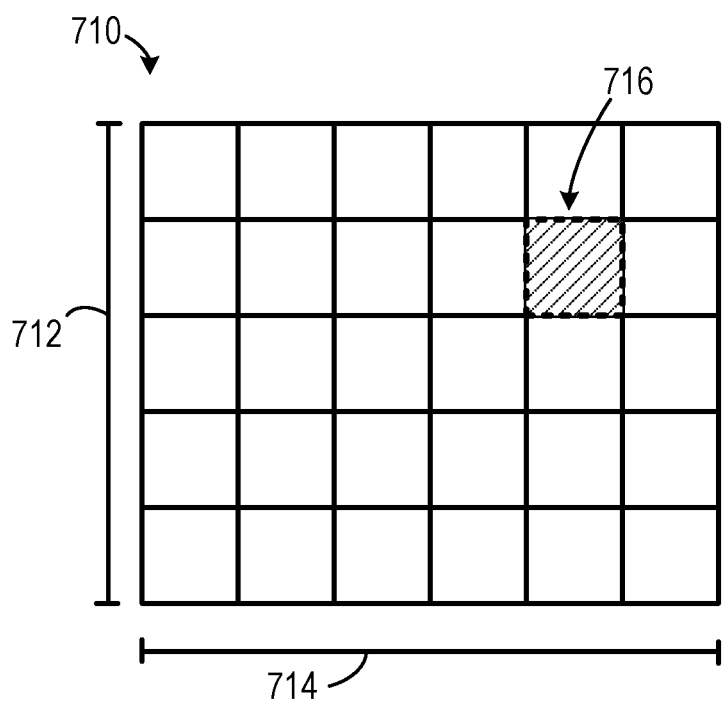
FIG. 7B depicts a two-dimensional (2D) radar image, according to one or more example embodiments.

FIG. 7B depicts 2D radar image 710, which includes pixels that represent range data 712 and azimuth data 714 about measured surfaces within the environment. In other embodiments, radar image 710 may convey range data and Doppler data. The second stage filter may also involve generating a corresponding 2D image with pixels that represent predicted RCS measurements associated with vehicle self-reflections within the radar data (i.e., a vehicle self-reflection 2D image).

In order to generate the vehicle self-reflection 2D image, a computing device may use the predefined model and information within radar image 710. In particular, the information represented by pixels within radar image 710 (e.g., pixel 716) can be used to estimate power for vehicle self-reflections. The second stage filter process may then involve filtering (e.g., subtracting) the estimated power associated with vehicle self-reflections from RCS measurements represented by 2D radar image 710. In some examples, the computing device may use a neural network to perform the filter process.

Figure 7C:
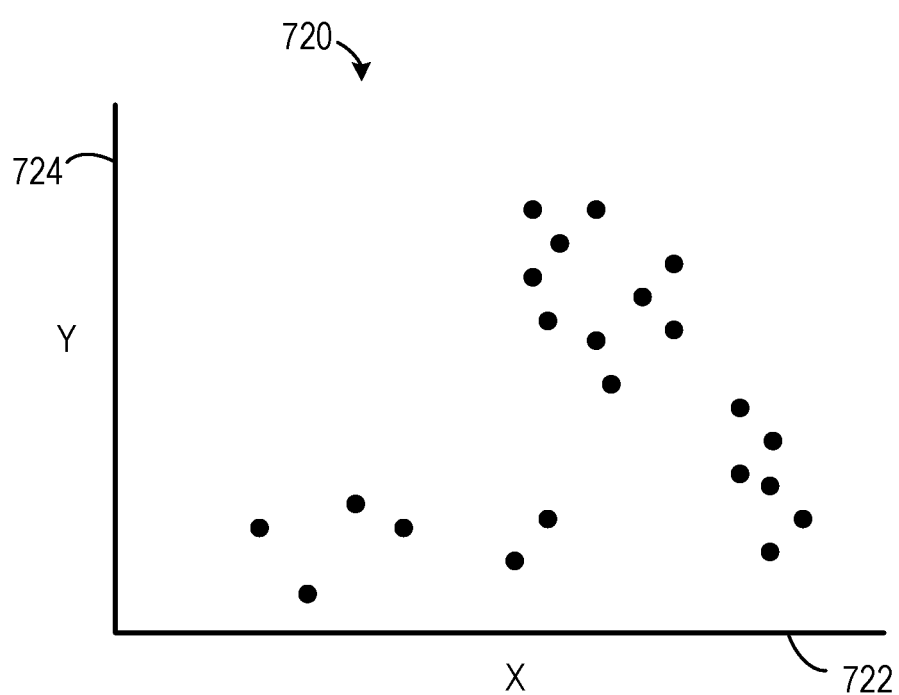
FIG. 7C depicts sparse radar data, according to one or more example embodiments.

At block 610, method 600 involves applying a third stage filter. The third stage filter may involve using radar data in a sparse data format. FIG. 7C illustrates sparse radar data, according to one or more example embodiments. Sparse radar data 720 is shown as a graph having data points arranged according to X-axis 722 and Y-axis 724. Each point also has an associated radial velocity (computed from its measured doppler). As such, the filter can involve removing data points based on predicted positions and radial velocity of vehicle self-reflections within sparse radar data 720. For instance, if a predicted self-reflection is at a position and radial velocity sufficiently close to a measured point, that point is considered a self-reflection and filtered out.

At block 612, method 600 involves providing information mapping the environment. For instance, the computing device may provide control instructions based on objects detected and identified within the radar data. The object detection can be performed accurately without potential ghost vehicles within the radar data due to the different filtering techniques used.

In some example embodiments, a processing system may execute multiple blocks of method 600 in parallel. For instance, the processing system can leverage multiple digital signal processing cores that contribute computational resources toward executing method 600.

Figure 8:
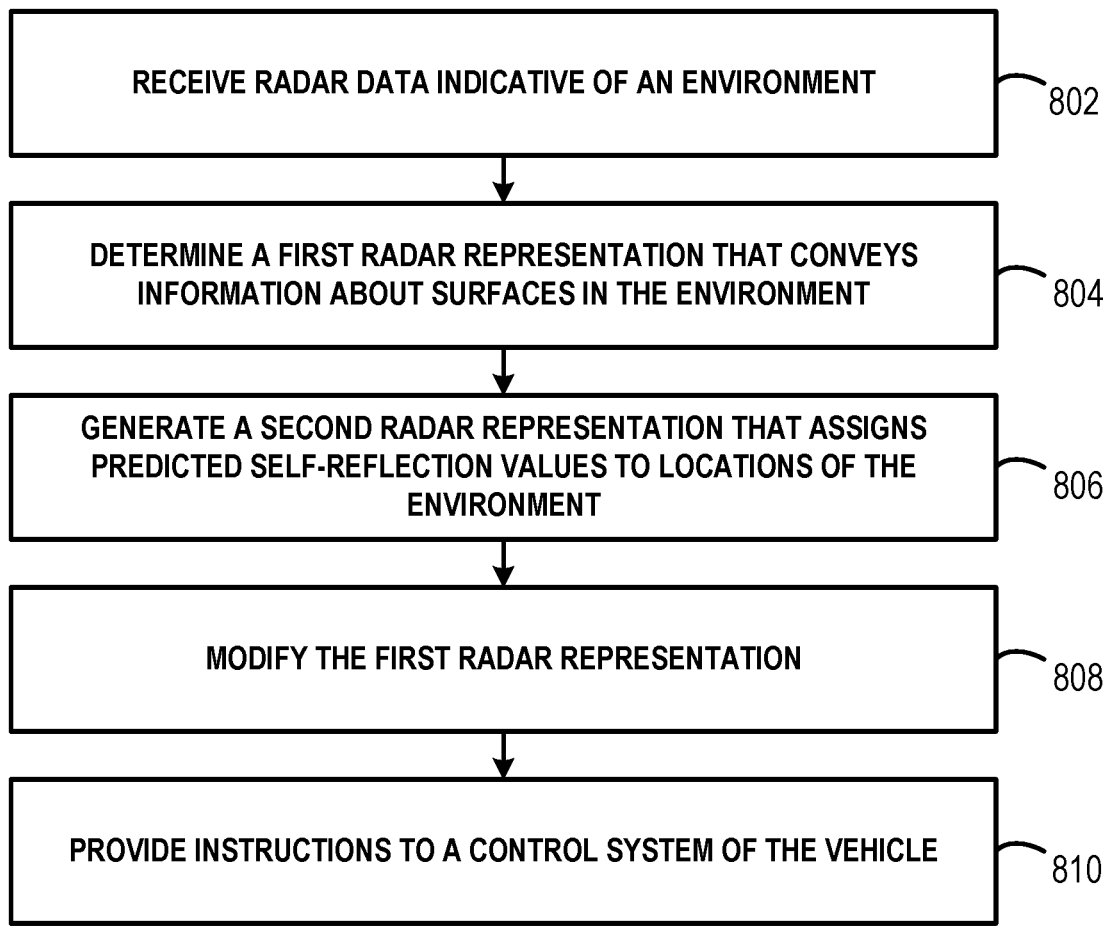
FIG. 8 is a flow chart of another method for performing a vehicle self-reflection technique, according to one or more example embodiments.

FIG. 8 is a flowchart of example method 800 for performing a vehicle self-reflection technique, according to one or more embodiments. Method 800 may include one or more operations, functions, or actions, as depicted by one or more of blocks 802, 804, 806, 808, and 810, each of which may be carried out by any of the systems shown in prior figures, among other possible systems.

At block 802, method 800 involves receiving, at a computing device and from a radar unit coupled to a vehicle, radar data indicative of an environment. One or more radar units can be used to obtain radar data.

In some embodiments, a computing device may cause the radar unit to transmit radar signals having stretch linear frequency modulated (LFM) waveforms. As a result, the computing device can receive radar data based on the radar signals having stretch LFM waveforms.

At block 804, method 800 involves determining a first radar representation that conveys information about a plurality of surfaces in the environment based on the radar data.

The first radar representation can differ within embodiments. In some examples, a computing device may determine a radar data cube having a first plurality of voxels that each indicate information about a given surface in the environment. Each voxel of the first plurality of voxels can further indicate a range, an azimuth, and a Doppler for a given surface in the environment.

In some embodiments, the computing device may use the radar data to determine a two-dimensional radar image having a first plurality of pixels that each indicate information about a given surface in the environment. The computing device may also use the radar data in the form of a sparse data set.

At block 806, method 800 involves generating, using a predefined model, a second radar representation that assigns predicted self-reflection values to respective locations of the environment based on the information about the plurality of surfaces conveyed by the first radar representation. The predefined model can enable a predefined self-reflection value to be assigned to a first location based on information about a surface positioned at a second location and a relationship between the first location and the second location. In some examples, the relationship between the first location and the second location indicates that the first location is positioned at a first range and a particular azimuth relative to the vehicle and the second location is positioned at a second range and the particular azimuth relative to the vehicle with the first range being approximately double the second range. In some examples, the relationship may further indicate that the first location includes a first Doppler relative to the vehicle and the second location includes a second Doppler relative to the vehicle, wherein the first Doppler is approximately double the second Doppler.

In some examples, a computing device may generate the second radar representation as a reflection data cube having a second plurality of voxels that each represent a predicted self-reflection value to a given location of the environment. Each voxel of the second plurality of voxels may further indicate a range, an azimuth, and a Doppler corresponding to a given location of the environment. The computing device may generate the second radar representation as a two-dimensional reflection image having a second plurality of pixels that each represent a predicted self-reflection value to a given location of the environment.

At block 808, method 800 involves modifying the first radar representation based on the predicted self-reflection values in the second radar representation.

In some examples, modifying the first radar representation involves performing a filter process that removes the reflection data cube from the radar data cube. For instance, the information about the plurality of surfaces indicated by the plurality of voxels includes a radar cross section (RCS) measurement for each surface. As such, the computing device may perform the filter process to subtract the predicted self-reflection values represented by the second plurality of voxels from RCS measurements for the plurality of surfaces indicated by the first plurality of voxels. In some examples, the computing device may further perform object detection using the first plurality of voxels based on subtracting the predicted self-reflection values represented by the second plurality of voxels from RCS measurements for the plurality of surfaces indicated by the first plurality of voxels.

In some examples, modifying the first radar representation involves performing a filter process that removes the two-dimensional reflection image from the two-dimensional radar image. For instance, the information about the plurality of surfaces indicated by the first plurality of pixels can include a RCS measurement for each surface. As such, the computing device may filter (e.g., subtract) the predicted self-reflection values represented by the second plurality of pixels from RCS measurements for the plurality of surfaces indicated by the first plurality of pixels. In some examples, the computing device may further provide the two-dimensional reflection image and the two-dimensional radar image to a neural network that is configured to the predicted self-reflection values represented by the second plurality of pixels from RCS measurements for the plurality of surfaces indicated by the first plurality of pixels.

In some examples, the two-dimensional radar image comprises both a Doppler measurement as well as an RCS measurement. This permits a modified filtering scheme: rather than filtering (e.g., subtracting) every predicted ghost pixel, a system can first check that the measured doppler for the first image pixel matches the predicted doppler for the ghost pixel, and only perform the filtering technique if these two are close enough (within a threshold). Otherwise the observed pixel data might not be a self-reflection. The predicted doppler for the ghost pixel is twice the Doppler of the first reflecting surface. The match comparison may also use a modular distance to account for Doppler aliasing. For example, a given radar waveform may measure the same doppler for an object moving towards the SDC at 50 meters per second (m/s) as for an object moving away from the SDC at 50 m/s, so the modular distance between +49 m/s and −49 m/s would be 2 m/s rather than 98 m/s.

At block 810, method 800 involves providing instructions to a control system of the vehicle based on modifying the first radar representation. In some examples, the computing device may identify, using the first radar representation, one or more objects in the environment based on modifying the first radar representation and provide instructions that represent the one or more objects to the control system.

Figure 9:
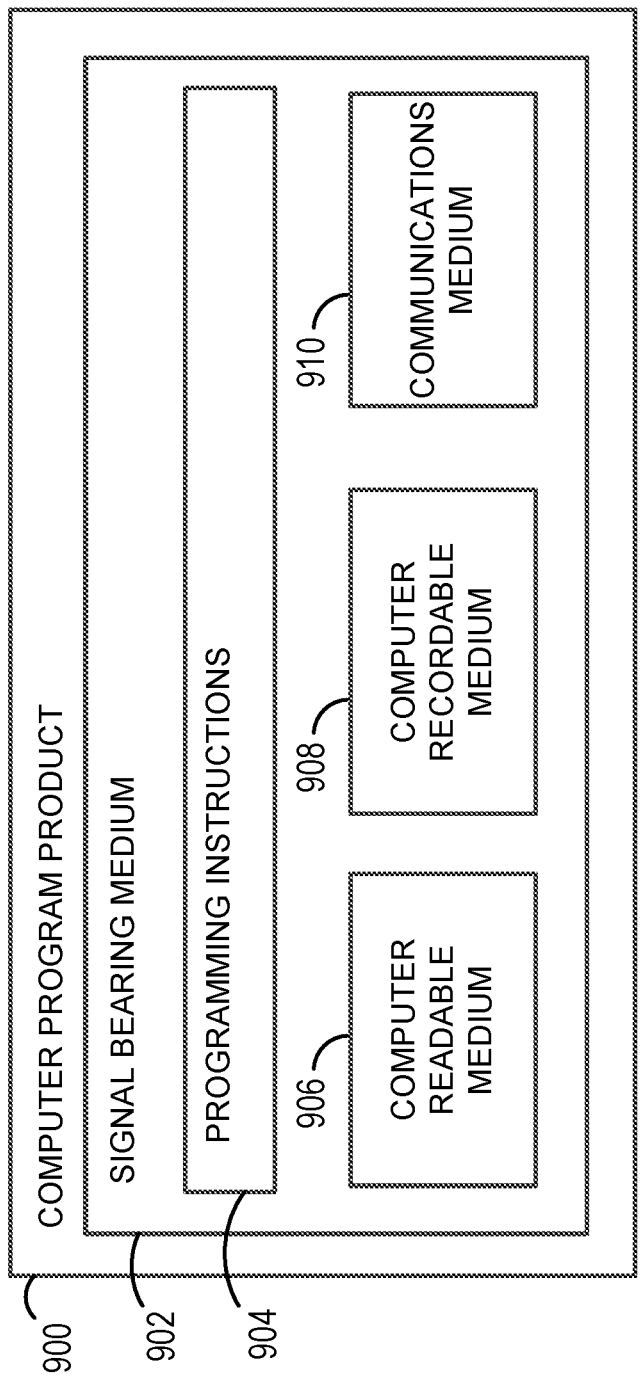
FIG. 9 is a schematic diagram of a computer program, according to one or more example embodiments.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 may be configured to provide various operations, functions, or actions in response to the programming instructions 904 conveyed to the computer system 112 by one or more of the computer readable medium 906, the computer recordable medium 908, and/or the communications medium 910. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device and from a radar unit coupled to a vehicle, radar data indicative of an environment;
   based on the radar data, determining a first radar representation that conveys information about a plurality of surfaces in the environment;
   generating, by the computing device and using a predefined model, a second radar representation that assigns predicted self-reflection values to respective locations of the environment based on the information about the plurality of surfaces conveyed by the first radar representation, wherein the predefined model enables a predefined self-reflection value to be assigned to a first location based on information about a surface positioned at a second location and a relationship between the first location and the second location;
   modifying the first radar representation based on the predicted self-reflection values in the second radar representation; and
   providing instructions to a control system of the vehicle based on modifying the first radar representation.

2. The method of claim 1, further comprising:
   causing, by the computing device, the radar unit to transmit radar signals having stretch linear frequency modulated (LFM) waveforms; and
   wherein receiving radar data indicative of the environment comprises:
   receiving radar data based on the radar signals having stretch LFM waveforms.

3. The method of claim 1, wherein the relationship between the first location and the second location indicates that the first location is positioned at a first range and a particular azimuth relative to the vehicle and the second location is positioned at a second range and the particular azimuth relative to the vehicle, wherein the first range is approximately double the second range.

4. The method of claim 1, wherein determining the first radar representation that conveys information about the plurality of surfaces in the environment comprises:
determining a radar data cube having a first plurality of voxels that each indicate information about a given surface in the environment.

5. The method of claim 4, wherein generating the second radar representation that assigns predicted self-reflection values to respective locations of the environment comprises:
generating a reflection data cube having a second plurality of voxels that each represent a predicted self-reflection value for a given location of the environment using the predefined model, wherein the relationship between the first location and the second location further indicates that the first location includes a first Doppler relative to the vehicle and the second location includes a second Doppler relative to the vehicle, wherein the first Doppler is approximately double the second Doppler.

6. The method of claim 5, wherein each voxel of the first plurality of voxels further indicates a range, an azimuth, and a Doppler for a given surface in the environment, and
wherein each voxel of the second plurality of voxels further indicates a range, an azimuth, and a Doppler corresponding to a given location of the environment.

7. The method of claim 6, where modifying the first radar representation based on the predicted self-reflection values in the second radar representation comprises:
performing a filter process that removes the reflection data cube from the radar data cube.

8. The method of claim 7, wherein the information about the plurality of surfaces indicated by the first plurality of voxels includes a radar cross section (RCS) measurement for each surface; and
wherein performing the filter process that removes the reflection data cube from the radar data cube comprises:
subtracting the predicted self-reflection values represented by the second plurality of voxels from RCS measurements for the plurality of surfaces indicated by the first plurality of voxels.

9. The method of claim 8, further comprising:
based on subtracting the predicted self-reflection values represented by the second plurality of voxels from RCS measurements for the plurality of surfaces indicated by the first plurality of voxels, performing object detection using the first plurality of voxels.

10. The method of claim 1, wherein determining the first radar representation that conveys information about the plurality of surfaces in the environment comprises:
determining a two-dimensional radar image having a first plurality of pixels that each indicate information about a given surface in the environment.

11. The method of claim 10, wherein generating the second radar representation that assigns predicted self-reflection values to respective locations of the environment comprises:
generating a two-dimensional reflection image having a second plurality of pixels that each represent a predicted self-reflection value to a given location of the environment.

12. The method of claim 11, wherein each pixel of the first plurality of pixels further indicates a range and an azimuth for a given surface in the environment, and wherein each pixel of the second plurality of pixels further indicates a range and an azimuth corresponding to a given location of the environment.

13. The method of claim 12, where modifying the first radar representation based on the predicted self-reflection values in the second radar representation comprises:
performing a filter process that removes the two-dimensional reflection image from the two-dimensional radar image.

14. The method of claim 13, wherein the information about the plurality of surfaces indicated by the first plurality of pixels includes a radar cross section (RCS) measurement for each surface; and
wherein performing the filter process that removes the two-dimensional reflection image from the two-dimensional radar image comprises:
subtracting the predicted self-reflection values represented by the second plurality of pixels from RCS measurements for the plurality of surfaces indicated by the first plurality of pixels.

15. The method of claim 12, wherein subtracting the predicted self-reflection values represented by the second plurality of pixels from RCS measurements for the plurality of surfaces indicated by the first plurality of pixels comprises:
providing the two-dimensional reflection image and the two-dimensional radar image to a neural network that is configured to filter the predicted self-reflection values represented by the second plurality of pixels from RCS measurements for the plurality of surfaces indicated by the first plurality of pixels.

16. The method of claim 1, further comprising:
based on modifying the first radar representation, identifying, using the first radar representation, one or more objects in the environment; and
wherein providing instructions to the control system of the vehicle based on modifying the first radar representation comprises:
providing instructions that represent the one or more objects to the control system.

17. A system comprising:
a radar unit coupled to a vehicle;
a computing device configured to:
receive, from the radar unit, radar data indicative of an environment;
based on the radar data, determine a first radar representation that conveys information about a plurality of surfaces in the environment;
generate, using a predefined model, a second radar representation that assigns predicted self-reflection values to respective locations of the environment based on the information about the plurality of surfaces conveyed by the first radar representation, wherein the predefined model enables a predefined self-reflection value to be assigned to a first location based on information about a surface positioned at a second location and a relationship between the first location and the second location;
modify the first radar representation based on the predicted self-reflection values in the second radar representation; and
provide instructions to a control system of the vehicle based on modifying the first radar representation.

18. The system of claim 17, wherein the relationship between the first location and the second location indicates that the first location is positioned at a first range and a particular azimuth relative to the vehicle and the second location is positioned at a second range and the particular azimuth relative to the vehicle, wherein the first range is approximately double the second range.

19. The system of claim 17, wherein the information about the plurality of surfaces in the environment includes radar cross section (RCS) measurements; and wherein the computing device is further configured to:

subtract the predicted self-reflection values in the second radar representation from corresponding RCS measurements in the first radar representation.

20. A non-transitory computer readable medium having stored therein instructions executable by one or more processors to cause a computing system to perform functions comprising:

receiving, from a radar unit coupled to a vehicle, radar data indicative of an environment;

based on the radar data, determining a first radar representation that conveys information about a plurality of surfaces in the environment;

generating, using a predefined model, a second radar representation that assigns predicted self-reflection values to respective locations of the environment based on the information about the plurality of surfaces conveyed by the first radar representation, wherein the predefined model enables a predefined self-reflection value to be assigned to a first location based on information about a surface positioned at a second location and a relationship between the first location and the second location;

modifying the first radar representation based on the predicted self-reflection values in the second radar representation; and providing instructions to a control system of the vehicle based on modifying the first radar representation.

\* \* \* \* \*